United States Patent
Coden et al.

(10) Patent No.: US 9,589,245 B2
(45) Date of Patent: Mar. 7, 2017

(54) INSIDER THREAT PREDICTION

(71) Applicant: International Business Machines Corporation, Armonk, NY (US)

(72) Inventors: Anni R. Coden, Bronx, NY (US); Ching-Yung Lin, Forest Hills, NY (US); Wan-Yi Lin, White Plains, NY (US); Yinglong Xia, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 14/246,816

(22) Filed: Apr. 7, 2014

(65) Prior Publication Data

US 2015/0286819 A1    Oct. 8, 2015

(51) Int. Cl.
*G06Q 10/06* (2012.01)
*H04L 29/06* (2006.01)
*G06F 21/55* (2013.01)

(52) U.S. Cl.
CPC ....... *G06Q 10/0635* (2013.01); *G06F 21/552* (2013.01); *G06F 21/554* (2013.01); *H04L 63/1425* (2013.01)

(58) Field of Classification Search
CPC ...... G06F 21/55; G06F 21/552; G06F 21/554; G06Q 10/0635; H04L 63/1425
USPC .................................................... 726/22–25
See application file for complete search history.

(56) References Cited

U.S. PATENT DOCUMENTS

| | | | |
|---|---|---|---|
| 8,256,004 B1 | 8/2012 | Hill et al. | |
| 8,266,697 B2 | 9/2012 | Coffman | |
| 8,375,452 B2 | 2/2013 | Raviv | |
| 8,468,599 B2 | 6/2013 | McCusker et al. | |
| 8,707,431 B2* | 4/2014 | Stephens | H04L 41/5061 726/22 |
| 2003/0233569 A1 | 12/2003 | Geib et al. | |
| 2007/0073519 A1 | 3/2007 | Long | |
| 2011/0184877 A1* | 7/2011 | McHugh et al. | 705/318 |
| 2011/0225650 A1* | 9/2011 | Margolies et al. | 726/22 |
| 2012/0030767 A1* | 2/2012 | Rippert et al. | 726/25 |
| 2012/0066763 A1 | 3/2012 | McHugh et al. | |
| 2013/0019309 A1 | 1/2013 | Strayer et al. | |

(Continued)

OTHER PUBLICATIONS

Carter et al. "A Combined Bayesian Markovian Approach for Behaviour Recognition", 2006 , pp. 761-764 http://ieeexplore.ieee.org/xpls/abs_all.jsp?arnumber=1699003&tag=1.*

(Continued)

*Primary Examiner* — Jung Kim
*Assistant Examiner* — Carlos M De Jesus Lassala
(74) *Attorney, Agent, or Firm* — Daniel P. Morris; Otterstedt, Ellenbogen & Kammer, LLP

(57) ABSTRACT

A method for predicting insider threat includes mining electronic data of an organization corresponding to activity of an entity, determining features of the electronic data corresponding to the activity of the entity, classifying the features corresponding to the activity of the entity, determining sequences of classified features matching one or more patterns of insider threat, scoring the entity according to matches of the classified features to the one or more patterns of insider threat, and predicting an insider threat corresponding to the entity according to the score.

12 Claims, 8 Drawing Sheets

(56) References Cited

U.S. PATENT DOCUMENTS

2013/0091085 A1* 4/2013 Sohn .................. G08B 31/00
706/46
2013/0125239 A1 5/2013 McHugh et al.

OTHER PUBLICATIONS

Mahmoud, "Identification and Prediction of Abnormal Behaviour Activities of Daily Living in Intelligent Environments", May 2012, pp. 1-200 http://www.lotfi.net/download/thesis/Identification%20and%20Prediction%20of%20Abnormal%20Behaviour%20Activities%20of%20Daily%20Living%20in%20Intelligent%20Environments%20-%20Sawsan%20Mahmoud.pdf.*

Senator et al., "Detecting Insider Threats in a Real Corporate Database of Computer Usage Activity", Nov. 2013, pp. 1393-1401 http://delivery.acm.org/10.1145/2490000/2488213/p1393-senator.pdf?ip=151.207.250.51&id=2488213&acc=ACTIVE%20SERVICE&key=C15944E53D0ACA63%2E4D4702B0C3E38B35%2E4D4702B0C3E38B35%2E4D4702B0C3E38B35&CFID=566658145&CFTOKEN=9405377.*

Ju et al., "A hybrid High-order Markov Chain Model for Computer Intrustion Detection", Feb. 1999, pp. 1-25 http://projects.laas.fr/METROSEC/DOC/A%20hybrid%20high%20order%20markov%20chain%20model%20for%20computer%20intrusion.pdf.*

Murphy et al. "Decision Support Procedure in the Insider Threat Domain", May 2012, pp. 159-163, http://ieeexplore.ieee.org/xpl/articleDetails.jsp?arnumber=6227700.*

Kruegel et al. "Bayesian Event Classification for Intrusion Detection", Dec. 2003, pp. 14-23 http://ieeexplore.ieee.org/xpls/abs_all.jsp?arnumber=1254306&tag=1.*

Ko-Jen Hsiao et al., Multi-criteria Anomaly Detection using Pareto Depth Analysis, University of Michigan, pp. 1-4, Dec. 4, 2012.

Ko-Jen Hsiao et al., Multi-criteria Anomaly Detection using Pareto Depth Analysis, Advances in Neural Information Processing Systems 25, pp. 854-862, Dec. 3-6, 2012.

Ted E. Senator et al., Detecting Insider Threats in a Real Corporate Database of Computer Usage Activity, Nineteenth ACM SIGKDD International Conference on Knowledge Discovery and Data Mining, pp. 1-9, Aug. 11-14, 2013.

Biswanath Mukherjee et al., Network intrusion detection, Network, IEEE , vol. 8, No. 3, pp. 26,41, May-Jun. 1994.

* cited by examiner

US 9,589,245 B2

INSIDER THREAT PREDICTION

GOVERNMENT LICENSE RIGHTS

This invention was made with Government support under Contract No.: W911NF-11-C-0200 awarded Army Defense Advanced Research Projects Agency (DARPA). The Government has certain rights in this invention.

BACKGROUND

The present disclosure relates to organizational security, and more particularly to predicting insider threat.

Insider threat refers to an organization's vulnerability stemming from persons or processes within the organization. Instances of insider threat include, for example, theft of intellectual property (e.g., trade secrets, know how, client lists), system sabotage, and fraud. Detecting insider threat is known to be a difficult problem.

BRIEF SUMMARY

According to an exemplary embodiment of the present invention, a method includes mining electronic data of an organization corresponding to activity of an entity, determining features of the electronic data corresponding to the activity of the entity, classifying the features corresponding to the activity of the entity, determining sequences of classified features matching one or more patterns of insider threat, scoring the entity according to matches of the classified features to the one or more patterns of insider threat, and predicting an insider threat corresponding to the entity according to the score.

According to an exemplary embodiment of the present invention, a method for predicting an insider threat associated with an entity includes deploying a plurality of models describing different types of insider threat, wherein the models correspond to a plurality of activities over a period of time, determining activities of the entity correspond to each of the models over a period of time, and determining the probability of the insider threat for the entity using the plurality of models given the sequence of the activities.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, entities within an organization are associated with a degree or probability of insider threat, herein referred to as insider threat prediction. The prediction is based on one or more profiles of entity activity and multiple patterns of entity activity indicative of insider threat. Given an entity determined to be exhibiting a profile that matches at least one of the patterns (that is, the entity has a probability, greater than a threshold, of matching a pattern), a plurality of probabilities are determined for the entity corresponding to at least one other pattern. The probabilities of matching the different patterns are combined to make a prediction of insider threat corresponding to the entity.

Figure 1:
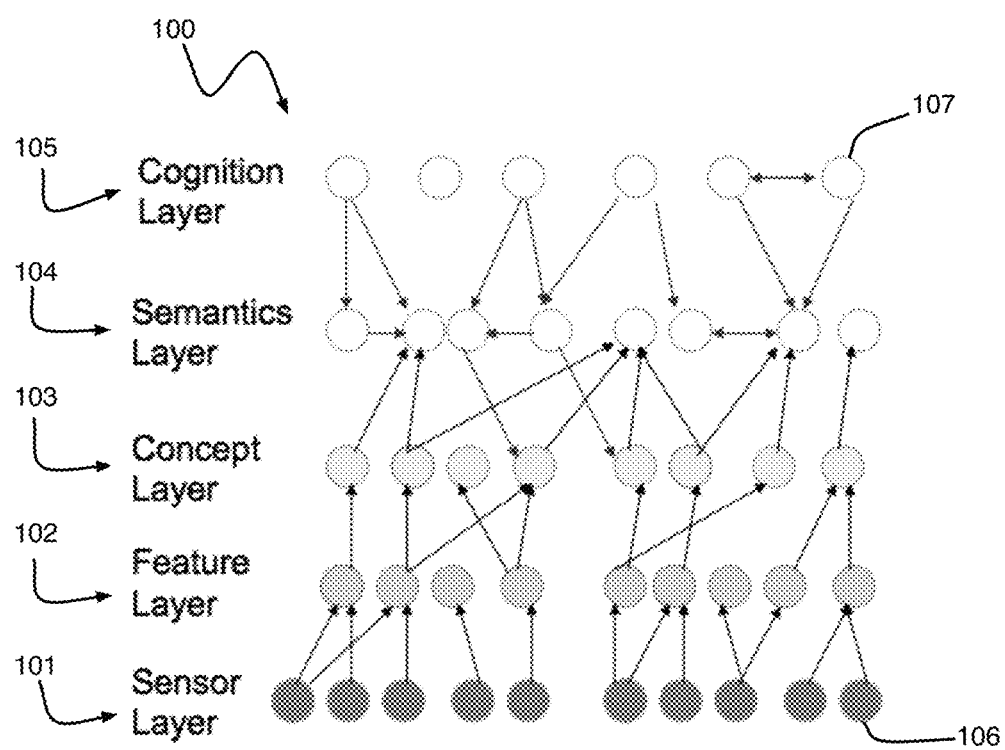
FIG. 1 an exemplary multi-modality multi-layer model for insider threat prediction according to an exemplary embodiment of the present invention.

One or more embodiments of the present invention implement a multi-modality multi-layer understanding of entity activity. Referring to FIG. 1, one exemplary model 100 for understanding of entity activity includes a plurality of layers of understanding configured using deterministic classification and learning inference. Each layer corresponds to a function such as data collection at a sensor layer 101, feature extraction (for example, the number of files copied by an entity each day) at a feature layer 102, handling outliers, unusual activities, emotions, and stressor detection at a concept layer 103, performing a statistic-based fusion of concepts with the same semantics (for example, using a Pareto Depth Analysis on unusual file downloads compared to self and peer groups) at a semantics layer 104, and behavior cognition combining domain knowledge and Bayesian network techniques at a cognition layer 105. In FIG. 1 the nodes 106 (i.e., shaded nodes) represent observations and nodes 107 (i.e., open nodes) represent latent variables.

Figure 2:
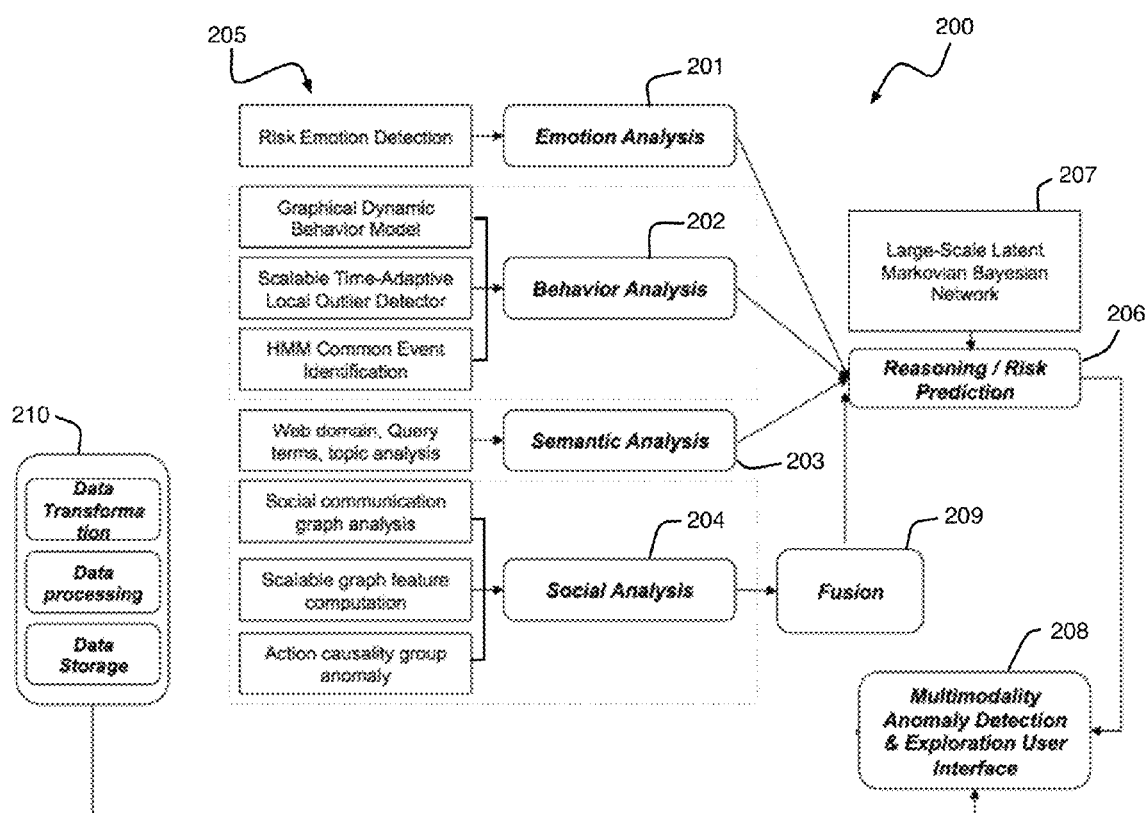
FIG. 2 is a flow diagram representing a method for detecting anomalous behavior according to an exemplary embodiment of the present invention.

FIG. 2 is a flow diagram representing a method 200 for detecting anomalous behavior within an organization's infrastructure according to an exemplary embodiment of the present invention. According to an exemplary embodiment of the present invention, the organization's infrastructure includes, but is not limited to, computers, networks, databases (e.g., local and cloud based), communication devices, physical plants (e.g., buildings, vehicles, etc.), security devices, email servers and databases, financial accounts, etc.

In method 200 a plurality of analysis modules are implemented corresponding to the concept layer 103 of FIG. 1. In the example of FIG. 2 these analysis modules include an emotion analysis module 201, a behavior analysis module 202, a semantic analysis module 203, and a social analysis module 204. Each analysis module takes different input 205, e.g., risk emotion detector, hidden Markov model (HMM) common event identification, etc. Each analysis module 201-204 outputs classified entity activity (e.g., data classified as indicating anxiety) and a corresponding score (e.g., confidence level).

According to an embodiment of the present invention, each analysis module 201-204 uses a comparison baseline for entity activity. The baseline can be established for the particular entity based on historical data or established based on a community to which the entity belongs.

According to an embodiment of the present invention, a fusion module 209 is implemented in connection with one or more of the analysis modules 201-204 for aggregating multiple input anomaly scores/probabilities and outputting an aggregated score of the respective analysis module. The fusion module 209 can apply one or more known statistical methods, such as taking the maximal value over all input scores or Pareto depth analysis, for perform a fusion.

Referring again to the concept layer 103, anomalous behavior or outliers are derivable from features extracted from the different input 205. The features represent entity activity such as search terms, visited webpage domains, email communications, types of webpages browsed, etc. From these features, anomalous activity is determined by comparing the features with, for example, the entity's history, the activity of peers or peer groups, or other communities. According to one or more embodiments of the present invention, the comparison is performed by determining a local-density of features (of the entity) in multi-dimensional feature space and tracking changes in the local-density of the entity. A change greater than a threshold corresponds to the detection of an anomalous behavior.

Figure 4:
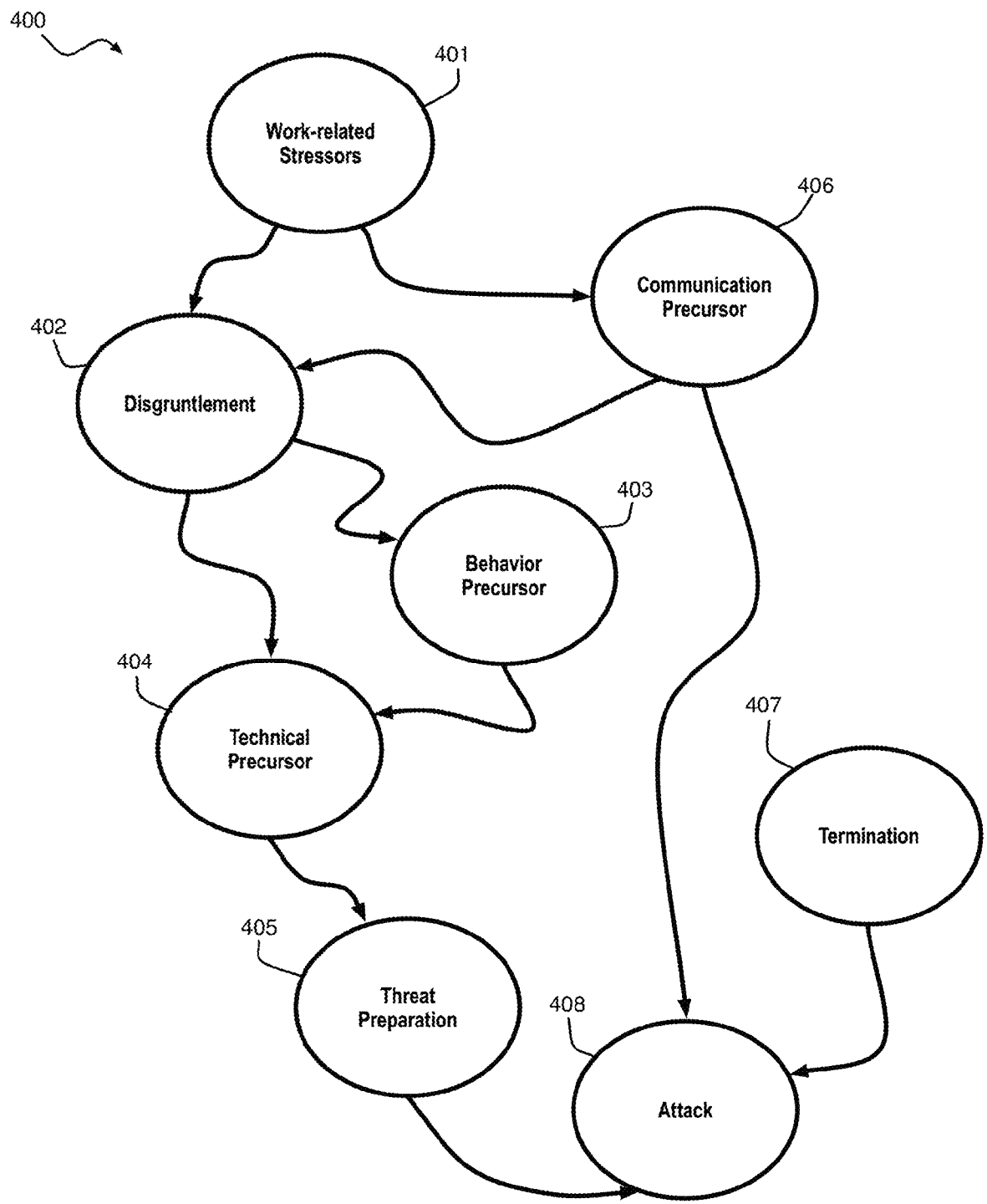
FIG. 4 is an exemplary pattern of sabotage according to an exemplary embodiment of the present invention.
Figure 5:
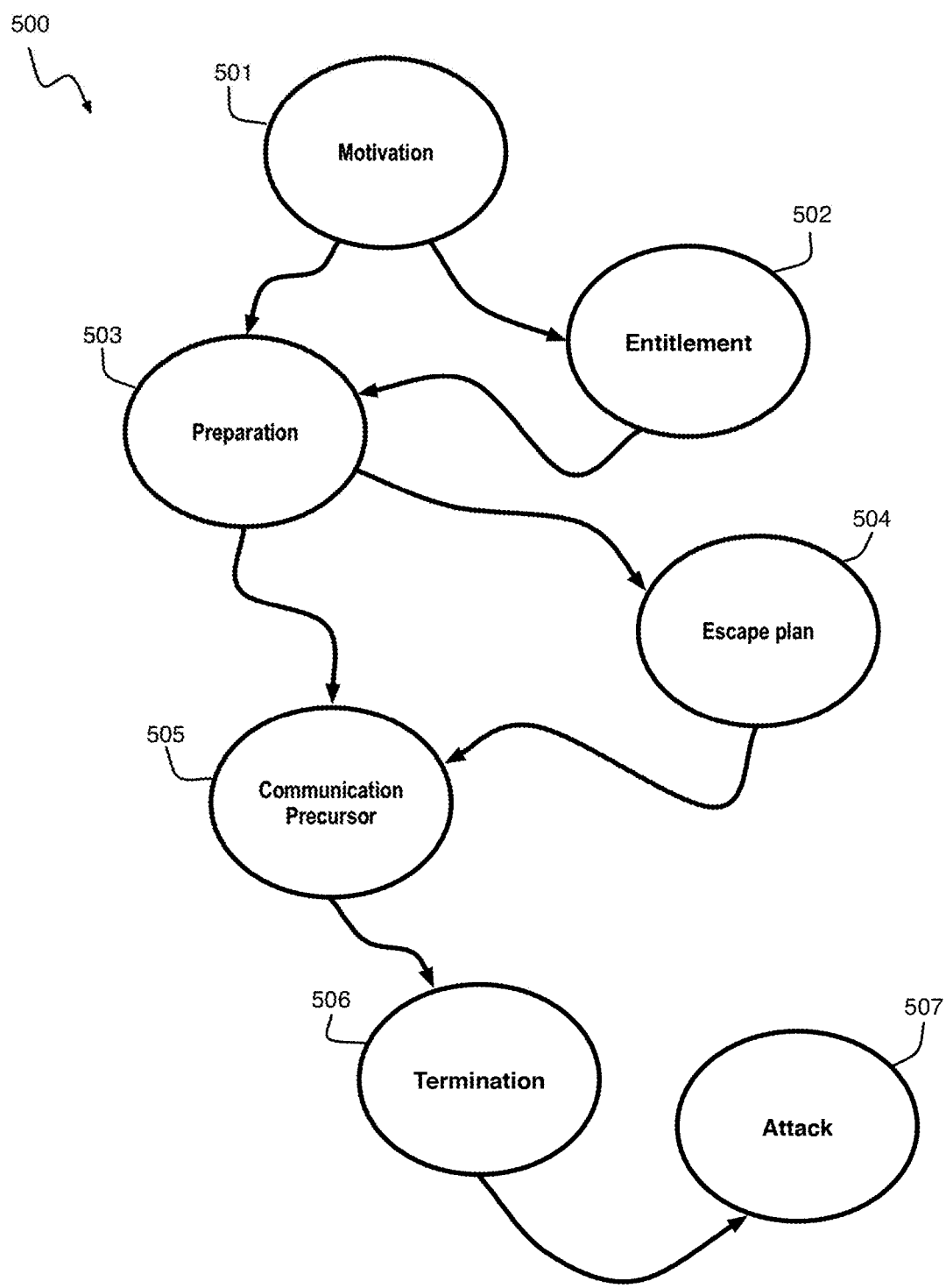
FIG. 5 is an exemplary pattern of theft according to an exemplary embodiment of the present invention.
Figure 6:
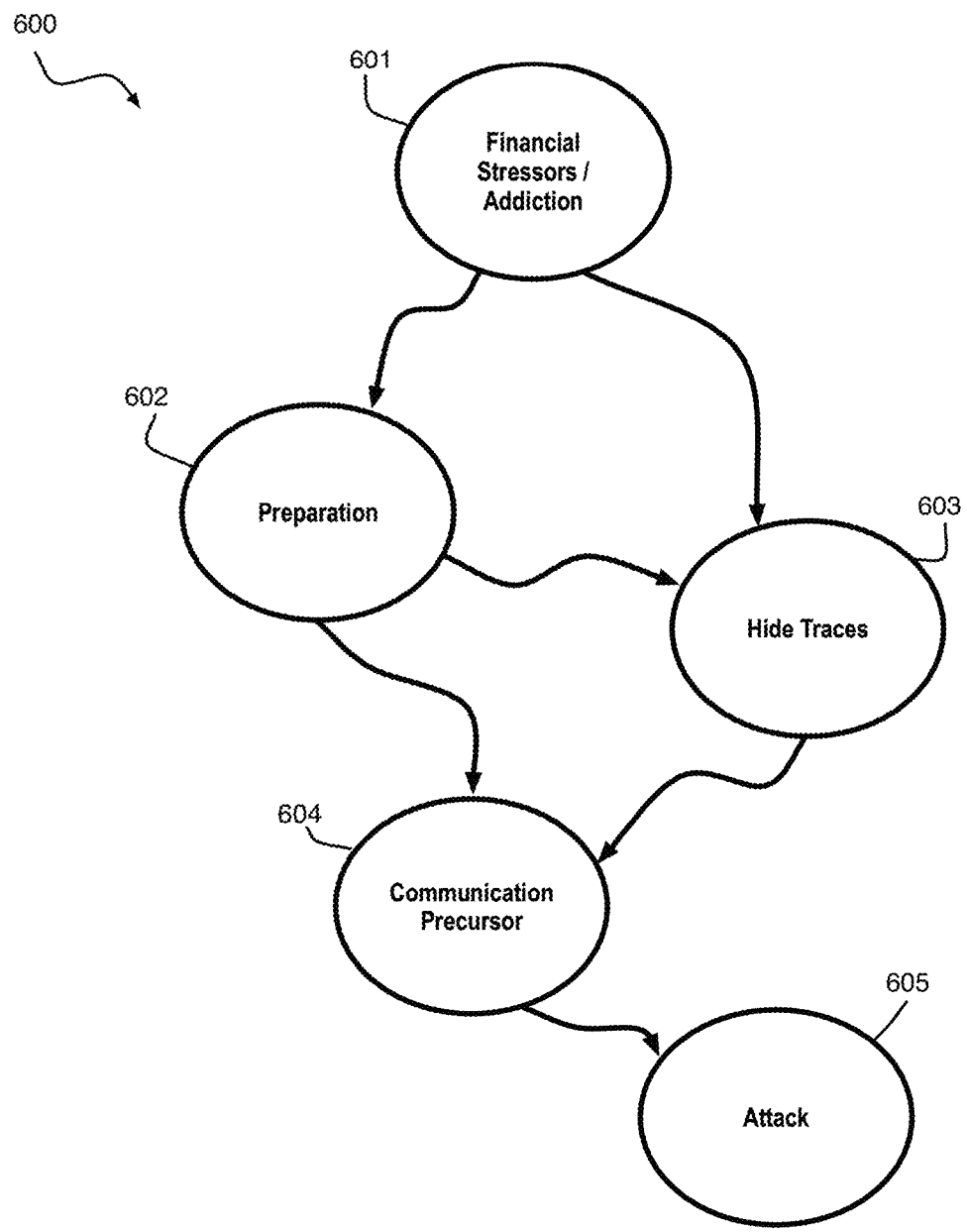
FIG. 6 is an exemplary pattern of fraud according to an exemplary embodiment of the present invention.

According to one or more embodiments of the present invention, a reasoning/risk prediction module 206 combines the different outputs of the analysis modules 201-204, including the classified entity activities and the corresponding scores, for a given entity into a profile of entity activity and compares the profile of entity activity to one or more models (see for example, FIGS. 4-6). According to one or more embodiments of the present invention, the reasoning/risk prediction module 206 compares (e.g., by applying a probabilistic graphical model such as a Markovian Bayesian Network 207) the profile of activity to one or more data sets, including for example, a profile of community activity, a profile of the activity of peers, and a profile of historical data of the entity (for example, to determine how the entity's prediction of insider threat compares to other entities or groups). The reasoning/risk prediction module 206 is configured to output anomaly detection results based on the comparison(s).

Further, according to one or more embodiments of the present invention, the reasoning/risk prediction module 206 performs an anomaly detection method that receives time-adaptive local outlier factors and analyzes these factors or data points sequentially by time to capture behavioral transitions of the entity. That is, in one or more embodiments of the present invention, at least one of the probabilities of matching a pattern considers an outlier factor that develops over time. According to one or more embodiments of the present invention, the anomaly detection method applies a bi-metric (e.g., the number of accesses and the number of users in the community) statistic-based anomaly detection method. It should be understood that other anomaly detection methods can be applied without departing from the scope of the present invention.

According to an exemplary embodiment of the present invention, the comparison performed by the reasoning/risk prediction module 206 is performed by one of content analysis, time adaptive outlier detection, and a hierarchical Markovian Bayesian network (MBN).

In the exemplary case of an MBN, the comparison includes determining value of each node in the MBN, which forms a Markov chain in the temporal domain. Within the MBN, nodes are categorized as observable nodes that are derived from user activities and latent nodes that are inferred from observable nodes. Within the MBN, parent nodes of the latent nodes can be latent or observable nodes. Observable nodes have no parents. Latent nodes form a layered structure, where the bottom layer has an attack node (see for example, FIGS. 4-6). The values of the latent nodes of the MBN can be inferred from their parents or assigned under subjective judgment. The MBN supports parallelism and is suitable for large scale detection (e.g., hundreds of thousands of users). For example, an eight-node MBN for five thousand entities with thirty-days of data in serial may take several minutes to complete processing. With parallel MBN implementation, the runtime can be reduced by dividing entities into groups and run several groups at the same time over multiple cores.

According to an exemplary embodiment of the present invention, a plurality of detectors (see for example, 205, FIG. 2) are deployed to analyze semantics. According to an exemplary embodiment of the present invention, the detectors are embodied in hardware and/or software within an organization's infrastructure to gather data and detect different activities. For example, in the example of web access, a detector analyzes the type of content downloaded (e.g., images, videos), categories of web domain access (e.g., travel, webmail, etc.), query terms, and SureView defined access methods (e.g., HTML, Javascript). Further, the semantics can include the use of threat programs (e.g., to detect whether virus protection has been modified or turned off), development environments (simulators), and secret transmissions (e.g., the use of encryption, cryptography). Other examples of semantics includes particular e-mail domains, file access (e.g., to critical files), print files from the network, download files to removable drives and risk-related emotion and stressors.

According to an exemplary embodiment of the present invention, a multimodality anomaly detection and exploration user interface 208 provides a mechanism to review the output of the reasoning/risk prediction module 206, e.g., in a graphical user interface. The interface 208 interfaces with a data block 210, which reads raw collected data and abstracts the data into meaningful and readable activities, which can be browsed and displayed using the interface 208. For example, an activity such as an entity visiting a network address at 10:00 a.m. can generate hundreds of requests to different network addresses along a route and associated background image downloads within several milliseconds of 10:00 a.m. in the raw data. The data block 210 groups these requests and downloads together as the activity of visiting the network address.

Figure 3:
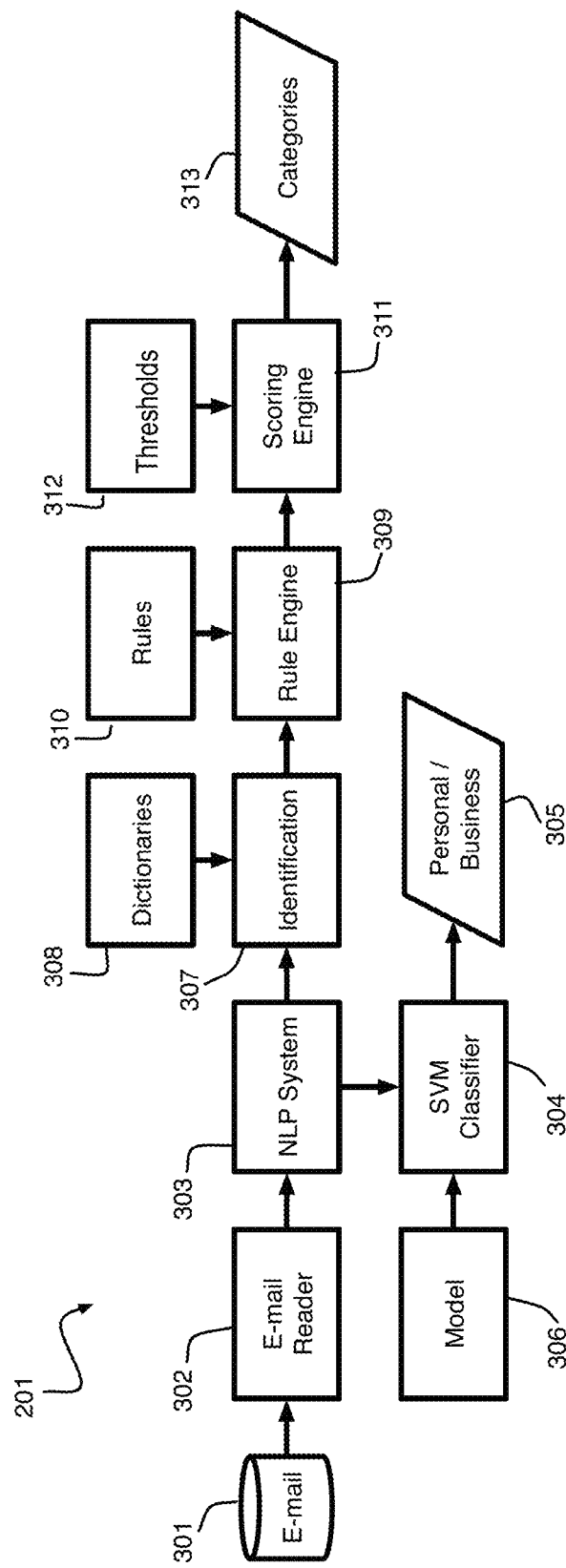
FIG. 3 is a diagram of system embodying a concept layer of the multi-modality multi-layer model according to an exemplary embodiment of the present invention.

FIG. 3 depicts an exemplary system configured to embody the emotion analysis module 201 of FIG. 2. In FIG. 3 each e-mail thread of an entity is classified into one or more categories (e.g., anger, aggressiveness, anxiety, disgruntlement, possessiveness/territorial, sexuality, entitlement, negative emotionality, dehumanization, ideological expression, victimization, and depression) and associated with an overall risk level. More particularly, data of an organization's email database 301 is gathered by an email reader 302. The email reader 302 outputs the data to a natural language processing (NLP) module 303. The NLP module 303 performs one or more operations to apply NLP annotations to the data, detect content structure (e.g., header, subject, body), extract metadata, determine lexical features, divide the data into tokens, and detect sentences. The NLP module 303 outputs data to a support vector machine (SVM) 304 to determine whether the data relates to the organization 305 based on one or more models 306. An identification module 307 applies one or more dictionaries 308 to detect key words (e.g., indicative of the emotional concept) in the data. A rule engine 309 decides how many sentences in the email satisfy rules 310 based the detected key words. A scoring engine 311 scores the data and applies thresholds 312 to categorize the data at 313.

According to an exemplary embodiment of the present invention, a method for predicting insider threat detects anomalies in entity activity. The method uses multiple models for insider threat including a model for insider threat sabotage activity (see FIG. 4), a model of espionage activity (see FIG. 5), and a model of insider fraud activity (see FIG. 6). Each model includes nodes representing precursors of attack for a specific type of insider. These models represent precursors or patterns of activity corresponding to insider threat. The edges in the models connect the nodes and represent dependencies and relationships between the precursors. The nodes correspond to detectors, which identify anomalous activity in certain semantics. According to an exemplary embodiment of the present invention, a system for predicting insider threat by combining multiple detector results based on insider threat behavior models.

According to an exemplary embodiment of the present invention, an insider threat detection system analyzes computer activity. The computer activity corresponds to entities accessing a machine of an organization. Exemplary computer activity includes logon/logoff, e-mail, instant messaging, processes launched on the machine, file access (locally or from a networked location). File access includes read and write operations, scanning, printing, etc.

According to an exemplary embodiment of the present invention, the multiple models fuse results from the detectors. Each detector takes raw data (entity activity) as input and outputs an anomaly measurement (e.g., a value between 0 and 1, where 0 corresponds to low anomalous activity and 1 corresponds to highly anomalous activity). Each model (e.g., 200, FIG. 2) takes a subset of the output of lower-level detectors and outputs an anomaly measure between 0 and 1.

A multi-modality multi-layer model of insider threat includes a plurality of detectors corresponding to features such as planning, job related stress, unusual communication with others, and workplace conflict. These features are precursors to attack. Each precursor can be detected by fusing the results of a plurality of detectors. For example, emotion expressed in an email, the user's email egonet in or out weight changes, session length and job stress are indicators of workplace conflict.

FIG. 4 is a conceptual depiction of sabotage activity. FIG. 4 depicts a sequence of actions including behavior precursors (403), technical precursors (405), and attack (408). FIG. 1 models an entities reasoning culminating in attack at 408.

In the model, work-related stressors (401), including for example, job performance decline, reduced work hours, etc. The work-related stressors (401) represent a root node leading to disgruntlement (402) characterized by unmet expectations due to, for example, slow or no promotion, demotion, supervisor/coworker disagreement, entitlement (e.g., change in access level), bonus/salary dissatisfaction, imposition of deadlines/milestones, etc.

The behavior precursors (403) including for example, remote log-in indicative of information gathering, and the use of non-standard accounts (e.g., a shared account, a compromised account, an account designated for external users). The behavior precursors (403) are preceded by work-related stressors (401), including for example, job performance decline, reduced work hours, etc.

Technical precursors (404) include threat development and threat programs. More particularly, the technical precursors (404) include activity such as the creation of backdoors in software, installing remote network administration tools, disabling anti-virus protections, installing malicious tools (e.g., keystroke detectors, password cracker, viruses), deleting/downloading backups, etc.

Threat preparation (405) considers activity corresponding to testing of the technical precursors (e.g., using a remote network administration tool, accessing a backdoor without attack).

Termination (407) is another precursor to attack (408).

FIG. 5 is a conceptual depiction of espionage activity and theft. FIG. 5 depicts a sequence of actions including motivation (501), entitlement (502), preparation (503), planning (504), a communication precursor (505), termination (506) and attack (507).

The motivation (501) includes factors such as dissatisfaction, loyalty to another organization or position (e.g., another job), and money.

The preparation node (503) includes the determination of vulnerabilities (e.g., methods of transferring information), the collection of information (e.g., e-mail, phone, fax, remote download, download to removable drives, printing). The preparation node (503) can also include the detection of activities related to copying and deleting files.

The entitlement node (502) is characterized by activities indicative of a feeling of entitlement, which are manifested in an entitlement to take information, credentials, source code, client information, etc. Data corresponding to entitlement is identifiable by content (e.g., is the information access by the entity appropriate to the entity's position, current projects).

According to an embodiment of the present invention, the detectors for espionage and theft are disposed on transfer paths for information. For example, in e-mail filters that detects communications to other organizations (e.g., competitors), web-mail, locations (e.g., to foreign countries, large attachments. Other transfer paths include removable storage devices (e.g., compact disks, USB memory devices, and removable hard drives). Further exemplary detectors track a total size of file access per day. Within the organization, a detector can analyze data related to foreign travel and information gathering.

The planning node (504) detects access of information outside of an entities area of expertise, outside of a business, etc.

FIG. 6 is a conceptual depiction of fraud. FIG. 6 depicts a sequence of actions including stress (601), preparation (602), planning (603), a communication precursor (604), and attack (605).

The stress node (601) includes financial difficulties (e.g., medical bills), repetitive behavior with adverse consequences (e.g., gambling), spending habits, family, treat by outsiders gleamed from the organization's data. These factors can be detected through the email or instant messaging the user wrote, or through the websites that the user visited. For example, a user checking expensive shopping websites and place orders could possibly have spending habits that can cause financial stress, and a user who talks about family problems in the email could possibly be facing stress too.

The preparation node (602) analyzes data to detect contact with outsiders, attempts to exfiltrate and/or edit information in critical files, etc. For example the preparation node (602) is configured to detect information manipulation, even in a case where the information manipulated may be difficult for an end user to detect on their own. For example, a user committing a fraud in a financial organization may manipulate the last digit of each transaction over a period of months or years, wherein the manipulation floors the transactions to a cent (rather than rounding to a nearest cent) and transfer the difference to an account of the user. The difference, which is at most one cent per transaction, is detected by the preparation node (602).

According to an exemplary embodiment of the present invention, once an entity is determined to exhibit activity matching one or more of the patterns of insider threat (see for example, FIGS. 4-6) (e.g., based on a probability and a threshold) an alert is determined. The matching or alert indicates that a corresponding probability is greater than a threshold. The threshold can be predetermined, user determined, and can be different for different applications. The thresholds can be different for different patterns. For example, in one pattern a probability greater than 0.5 will result in an alert, while in another application a probability greater than 0.75 will result in an alert. For an entity exhibiting activity matching at least one pattern, a probability is determined for the entity corresponding to each of the respective patterns. The probabilities of matching the different patterns are combined to determine a prediction or probability of insider threat (e.g., entity A's insider threat is 0.65). According to an exemplary embodiment of the present invention, the prediction of insider threat is compared to a threshold for action (e.g., a threshold probability greater than 0.5), as a prerequisite to performing, for example, an audit of the entity's activity, enacting one or more additional security procedures in connection with the entity, etc.

It should be understood that an entity in the context of one or more embodiments of the present invention is a computer terminal, computer client, computer server, contractor, employee, vendor, etc.

Figure 7:
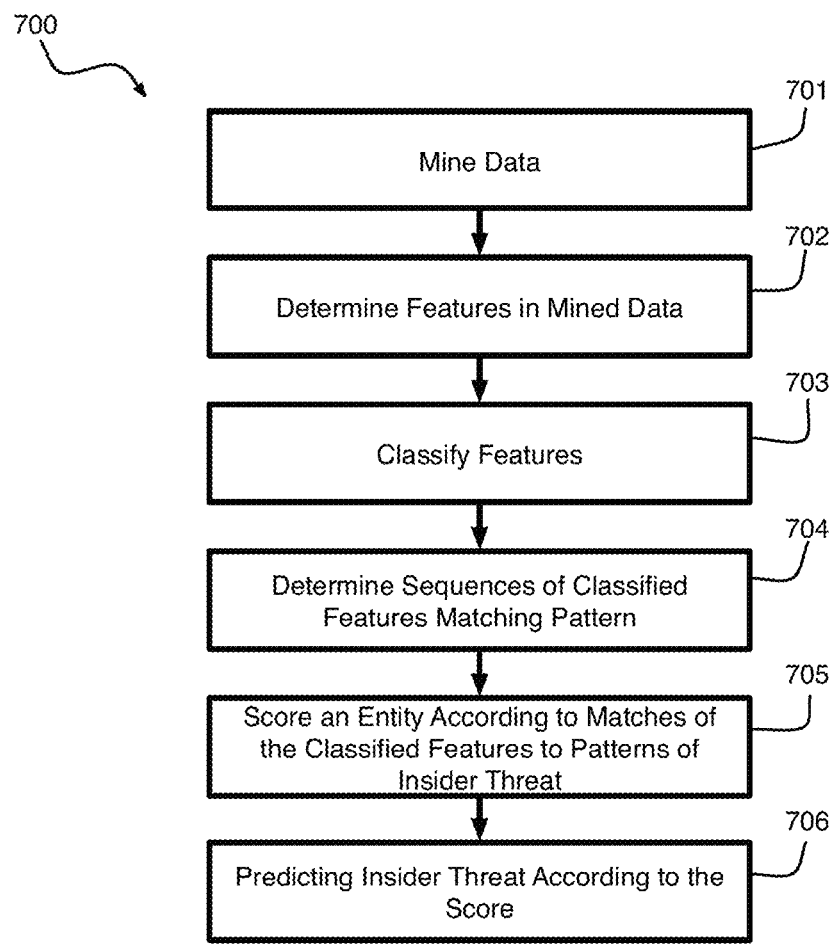
FIG. 7 is a flow diagram of a method of insider threat prediction according to an exemplary embodiment of the present invention.

According to an exemplary embodiment of the present invention, and in view of the foregoing, a method (see FIG. 7) for predicting insider threat 700 includes mining data corresponding to activity of an entity 701, determining features of the minded data 702, classifying the features 703, determining sequences of classified features matching one or more patterns of insider threat 704, scoring the entity according to matches of the classified features to the one or more patterns of insider threat 705, and predicting an insider threat according to the score 706 (e.g., an interpretation of the score).

It should be understood that the methodologies of embodiments of the invention may be particularly well-suited for predicting insider threat.

By way of recapitulation, according to an exemplary embodiment of the present invention, a method for determining a probability of an attack includes deploying a plurality of models (patterns) of attack, wherein each of the models of attack includes at least one sequence of activities corresponding to an alert having a probability of attack, wherein the probability of attack of is a function of a probability of alerts for the sequence of activities, detecting activities of an entity within an organization, detecting a sequence of the activities corresponding to at least one of the alerts over a period of time; and determining the probability of the attack for the entity using the plurality of models of attack.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor", "circuit," "module" or "system."

Furthermore, it should be noted that any of the methods described herein can include an additional step of providing a system for predicting insider threat (see for example, FIG. 1) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a module including a plurality of models of attack, wherein each of the models of attack includes at least one sequence of activities corresponding to an alert having a probability of attack, a detection module detecting activities of an entity within an organization, detecting a sequence of the activities corresponding to at least one of the alerts over a period of time, and determining a probability determining module determining the probability of the attack for the entity using the plurality of models of attack. Further, a computer program product can include a tangible computer-readable recordable storage medium with code adapted to be executed to carry out one or more method steps described herein, including the provision of the system with the distinct software modules.

Figure 8:
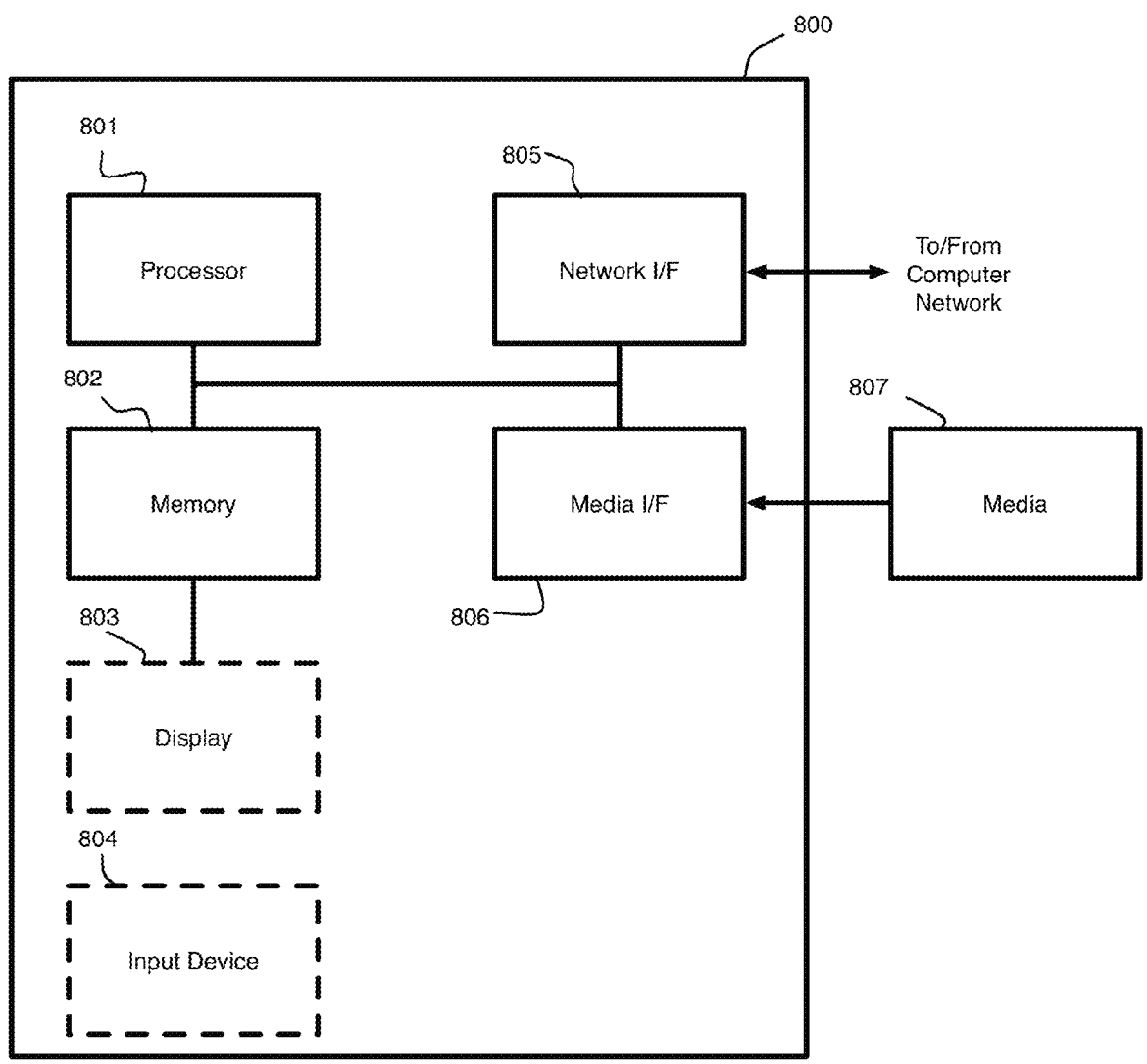
FIG. 8 is a diagram of a system configured to predict insider threat according to an exemplary embodiment of the present invention.

Referring to FIG. 8; FIG. 8 is a block diagram depicting an exemplary computer system for predicting insider threat according to an embodiment of the present invention. The computer system shown in FIG. 8 includes a processor 801, memory 802, display 803, input device 804 (e.g., keyboard), a network interface (I/F) 805, a media IF 806, and media 807, such as a signal source, e.g., camera, Hard Drive (HD), external memory device, etc.

In different applications, some of the components shown in FIG. 8 can be omitted. The whole system shown in FIG. 8 is controlled by computer readable instructions, which are generally stored in the media 807. The software can be downloaded from a network (not shown in the figures), stored in the media 807. Alternatively, a software downloaded from a network can be loaded into the memory 802 and executed by the processor 801 so as to complete the function determined by the software.

The processor 801 may be configured to perform one or more methodologies described in the present disclosure, illustrative embodiments of which are shown in the above figures and described herein. Embodiments of the present invention can be implemented as a routine that is stored in memory 802 and executed by the processor 801 to process the signal from the media 807. As such, the computer system is a general-purpose computer system that becomes a specific purpose computer system when executing routines of the present disclosure.

Although the computer system described in FIG. 8 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method comprising:
deploying a plurality of detectors within an infrastructure of an organization;
storing electronic data in a database, the electronic data corresponding to computer activity of an entity detected by the plurality of detectors within the infrastructure of an organization;
determining, using the plurality of detectors, features of the electronic data corresponding to the computer activity of the entity, wherein different ones of the plurality of detectors are configured to detect different features;
classifying the features corresponding to the computer activity of the entity to determine classified features, each of the classified features having a score;
determining a plurality of sequences of the classified features, wherein each of the sequences of the classified features matches a different pattern of insider threat from among a plurality of models of insider threat activity, wherein the models of insider threat activity each include one or more of the patterns of insider threat;

determining a plurality of scores for the entity, each of the scores determined using an aggregation of the scores of the classified features in a corresponding one of the sequences of the classified features matching the patterns of insider threat; and predicting an insider threat corresponding to the entity and at least one of the patterns of insider threat using the scores, wherein the prediction of the insider threat causes a security procedure to be enacted within the infrastructure of the organization.

2. The method of claim 1, wherein determining features of the electronic data is performed over time.

3. The method of claim 1, wherein classifying the features corresponding to the computer activity of the entity further comprises determining a confidence of each classification.

4. The method of claim 1, wherein classifying the features corresponding to the computer activity of the entity further comprises comparing the features corresponding to the computer activity of the entity to a plurality of historic features of corresponding to historic computer activity of the entity.

5. The method of claim 1, wherein classifying the features corresponding to the computer activity of the entity further comprises comparing the features corresponding to the computer activity of the entity to a plurality of features of another entity.

6. The method of claim 1, wherein classifying the features corresponding to the computer activity of the entity further comprises comparing the features corresponding to the computer activity of the entity to a plurality of features of a plurality of entities in the organization.

7. The method of claim 1, wherein determining the plurality of scores for the entity comprises:
    determining a first probability that a first one of the sequences of the classified features match a first one of the patterns of insider threat;
    determining a second probability that a second one of the sequences of the classified features match a second one of the patterns of insider threat; and
    combining the first and second probabilities to determining a score of insider threat corresponding to the entity.

8. A computer program product for predicting insider threat, the computer program product comprising a computer readable storage medium having program instructions embodied therewith, the program instructions executable by a processor to cause the processor to perform a method comprising:
    deploying a plurality of detectors within an infrastructure of an organization;
    storing electronic data in a database, the electronic data corresponding to computer activity of an entity detected by the plurality of detectors within the infrastructure of an organization;
    determining, using the plurality of detectors, features of the electronic data corresponding to the computer activity of the entity, wherein different ones of the plurality of detectors are configured to detect different features;
    classifying the features corresponding to the computer activity of the entity to determine classified features, the classified features corresponding to nodes of one or more models of insider threat activity, wherein the nodes represent the detected computer activity of the entity;
    determining a plurality of sequences of the classified features, wherein each of the sequences of the classified features matches a different pattern of insider threat from among the models of insider threat activity, wherein the models of insider threat activity each include one or more of the patterns of insider threat;
    scoring the entity according to the matches of the sequences of the classified features to the patterns of insider threat; and
    predicting an insider threat corresponding to the entity and at least one of the plurality of sequences using the scoring,
    wherein the prediction of the insider threat causes a security procedure to be enacted within the infrastructure of the organization.

9. The computer program product of claim 8, wherein classifying the features corresponding to the computer activity of the entity further comprises determining a confidence of each classification.

10. The computer program product of claim 8, wherein classifying the features corresponding to the computer activity of the entity further comprises comparing the features corresponding to the computer activity of the entity to a plurality of historic features of corresponding to historic computer activity of the entity.

11. The computer program product of claim 8, wherein classifying the features corresponding to the computer activity of the entity further comprises comparing the features corresponding to the computer activity of the entity to a plurality of features of another entity.

12. The computer program product of claim 8, wherein scoring the entity comprises:
    determining a first probability that a first one of the sequences of the classified features match a first one of the patterns of insider threat;
    determining a second probability that a second one of the sequences of the classified features match a second one of the patterns of insider threat; and
    combining the first and second probabilities to determining a score of insider threat corresponding to the entity.

* * * * *